(12) United States Patent
McCollum (10) Patent No.: US 9,073,481 B2
(45) Date of Patent: Jul. 7, 2015

(54) BREAK-AWAY SWITCH ACTUATED TRAILER LIGHTING AND BRAKING SYSTEM

(76) Inventor: John McCollum, Cookville, TX (US)

(*) Notice: Subject to any disclaimer, the term of this patent is extended or adjusted under 35 U.S.C. 154(b) by 750 days.

(21) Appl. No.: 13/442,521

(22) Filed: Apr. 9, 2012

(65) Prior Publication Data

US 2013/0264863 A1 Oct. 10, 2013

(51) Int. Cl.
| | |
|---|---|
| *B60L 1/14* | (2006.01) |
| *G08B 21/00* | (2006.01) |
| *B60Q 11/00* | (2006.01) |
| *B60T 7/20* | (2006.01) |
| *B60Q 1/30* | (2006.01) |
| *B60Q 1/46* | (2006.01) |
| *B60T 17/22* | (2006.01) |

(52) U.S. Cl.
CPC . *B60Q 11/00* (2013.01); *B60T 7/20* (2013.01); *B60Q 1/305* (2013.01); *B60Q 1/46* (2013.01); *B60T 17/22* (2013.01)

(58) Field of Classification Search
CPC ................................... B60L 1/14; G08B 21/00
USPC .......................................... 307/10.8; 340/431
See application file for complete search history.

(56) References Cited

U.S. PATENT DOCUMENTS

| | | | | |
|---|---|---|---|---|
| 4,856,850 | A | * | 8/1989 | Aichele et al. .................. 303/20 |
| 6,225,918 | B1 | * | 5/2001 | Kam .............................. 340/903 |
| 2005/0258947 | A1 | * | 11/2005 | Kunianski ..................... 340/431 |
| 2006/0001529 | A1 | * | 1/2006 | Young ........................... 340/431 |
| 2006/0255921 | A1 | * | 11/2006 | Ungerman .................... 340/431 |

* cited by examiner

*Primary Examiner* — Rexford Barnie
*Assistant Examiner* — Joseph Inge
(74) *Attorney, Agent, or Firm* — James A. Italia; Italia IP

(57) ABSTRACT

A system for operating alarm features of a trailer towed by a tractor in the event of unintended decoupling of the trailer from the tractor. The system may include a breakaway switch or its functional equivalent, a flasher, and a source of emergency power such as a battery. The output of the system may operate only lights though the flasher, or optionally, also at least one electric brake of the trailer. Where braking is provided, the supply of electrical power is uninterrupted as by the flasher. Importantly, an anti-feedback feature prevents unintended operation of the lights and brake due to back-feeding from the electrical system of the tractor under ordinary operating conditions.

18 Claims, 5 Drawing Sheets

BREAK-AWAY SWITCH ACTUATED TRAILER LIGHTING AND BRAKING SYSTEM

FIELD OF THE INVENTION

The present invention relates to an automatic electrical and mechanical safety system for operating running lights alone and/or running lights and electric brakes of a towed vehicle, should the ordinary supply of electrical power from the tow vehicle be interrupted.

BACKGROUND OF THE INVENTION

Road going trailers may considerably extend the length, height, and width of their associated tractors. Such trailers are accordingly provided with lights for signaling to other motorists the intent of the driver, and electrical circuitry to transmit operational commands from the tractor to the lights of the trailer. Commercial trailers frequently have multi-conductor male and female plug type connectors for facilitating electrical signals for operating running lights and optionally, electric braking systems. The lights may be continuously operated running lights of the type popularly known as "marker lights". The lights may also include intermittently illuminated lights such as brake lights, turn signals, and flashing hazard indicators.

Road going trailers are susceptible to inadvertent decoupling from their tow vehicles, which may occur in the course of transit. This obviously presents a significant hazard to others using the same road. Even after coming to a complete stop, a trailer may be sufficiently inconspicuous to oncoming drivers, particularly in night and dense fog conditions, unable to provoke a defensive response until the time when a collision becomes inevitable. There exists a need to improve safety features for inadvertently decoupled, or "runaway", and decoupled trailers.

SUMMARY OF THE INVENTION

The present invention addresses the above stated need by providing a system which selectively operates certain lights in conjunction with an existing electric brake system on commercial and/or recreational secondary vehicles, hereinafter referred to as trailers, responsively to inadvertent decoupling of the trailer from its associated primary vehicle, hereinafter referred to as a tow vehicle. To this end, the novel system includes an actuator which responds to disconnection of the trailer or of its electrical connection to the tow vehicle by activating flashing illumination advisory and optionally, and/or activating an electric brake, a flasher to impart intermittent feed to lights intended to flash. Significantly, an anti-feedback feature is provided to inhibit operation of selected ones of the lights and electric brake under normal driving conditions with the trailer connected to the tow vehicle. If no anti-feedback feature were present, some of the running lights and the electric brake could operate while, for example, driving at highway speeds.

It is an object of the invention to provide a system for operating running lights in an intermittently flashing state and optionally, an electric and/or but not limited to electric over hydraulic brake in a trailer which has inadvertently become decoupled from its tow vehicle.

Another object of the invention is to cause running lights to flash responsively to inadvertent decoupling of the trailer from the tow vehicle and/or loss of tow vehicle power due to the loss of electrical connection.

A further object of the invention is to inhibit unintended operation of running lights and electric brake due to feedback under ordinary driving conditions.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, wherein direct current circuits are shown and described using conventional current direction representation rather than true flow direction, and wherein.

DETAILED DESCRIPTION

Figure 1A:
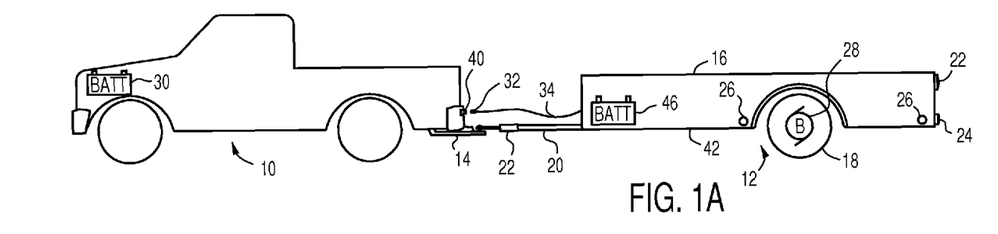
FIG. 1A is a diagrammatic side view of the environment of the invention depicting a representative passenger vehicle.

Referring first to FIG. 1A, according to at least one aspect of the invention, there is depicted a representative tow vehicle 10 and trailer 12 towed by the tow vehicle 10, which trailer 12 may be improved by incorporation of a system for selectively and automatically operating electrical safety apparatus of the trailer 12. The tow vehicle 10 is representative of any road going motor vehicle which may be operated by a driver and is utilized for tow duty, including passenger vehicles, tow vehicle trucks, trucks, and the like. The tow vehicle 10 will be understood to have a power train, cabin, at least one seat, operator controls, and other amenities (none shown) conventionally provided in road going motor vehicles. The tow vehicle 10 will be understood to have a trailer receiver or fifth-wheel 14 as depicted or a functional equivalent. The trailer 12 may have a load bed 42 and/or a body 16, at least one wheel 18, and a hitch, fifth-wheel 20 or functional equivalent. The trailer 12 has at least one external light source mounted on the chassis or body 16, such as a brake light 22, a running light 24, and side marker lights 26. Some trailers such as the trailer 12 are equipped with a dynamic or electric brake 28, shown symbolically in FIG. 1A.

The external light sources and the electric brake will be referred to collectively as electrical safety apparatus, as their purpose is primarily safety oriented. The electrical safety apparatus is conventionally connected to electrical power from the electrical system of the tow vehicle 10, the power source of the tow vehicle 10 being shown representatively as a battery 30 carried on board the tow vehicle 10. The various electrical components shown and described thus far are connected by conventional electrical circuitry, mostly not shown. Conventional components of this circuitry which are shown due to their significance to the present invention include a connector 32 associated with the tow vehicle 10, and flexible electrical conductors 34 associated with the wiring harness of the trailer 12. As depicted, the connector 32 may comprise a male plug connector which mates with a female socket 40 associated with the tow vehicle 10. Alternatively, the connector 12 may if desired be solidly mounted to the tow vehicle 10 or may comprise the terminus of flexible electrical conductors (not separately shown) which correspond and connect to the flexible electrical conductors 34. The flexible electrical conductors (not shown) of the tow vehicle 10 are conventionally provided in tow vehicles to extend circuitry to that of the trailer such as the trailer 12 for operating the electrical safety apparatus and optionally, other electrical equipment such as the interior lamp (not shown) of the trailer.

The present invention allows for automatic deployment of the electrical safety apparatus of the trailer 12 in the event of unintended decoupling of the trailer 12 from the tow vehicle 10 under ordinary operating conditions wherein the electrical safety apparatus is connected to power from the tow vehicle 10.

Figure 1B:
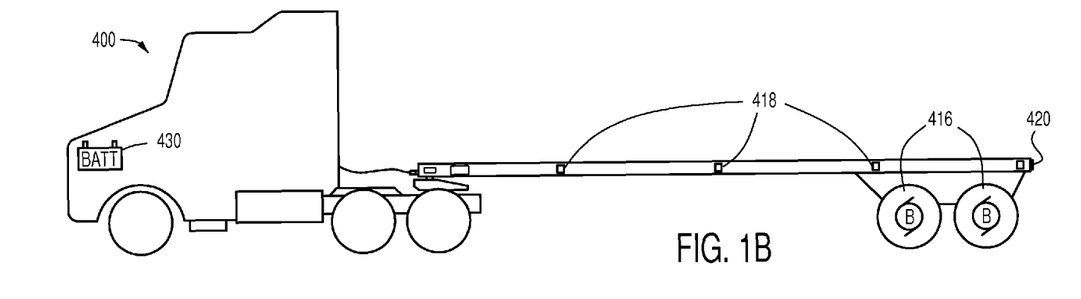
FIG. 1B is a diagrammatic side view of the environment of the invention depicting a large commercial vehicle.
Figure 1C:
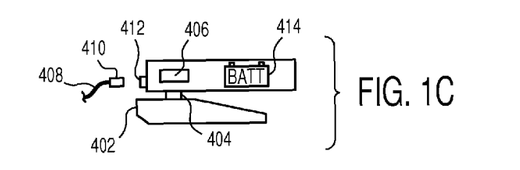
FIG. 1C is a side elevational detail view taken at the left center of FIG. 1B.

FIG. 1B shows a large, over the road tow vehicle 400 connected to a trailer 401 using a conventional fifth wheel 402 utilizing a conventional king pin 404. Conventional electrical connections to serve air brakes 416, running lights 418, brake lights 420, and turn signals (not visible in the side view of FIG. 1B) utilize a wiring harness 408 terminating in a multi-conductor connector such as a seven-way male connector 410. The seven-way male connector 410 may plug into a seven-way female socket 412. The wiring harness 408 provides operative power to the electric brakes 416, the running lights 418, and the brake lights 420 from a tow vehicle battery 430. Some of the fore mentioned components are shown to greater scale in FIG. 1C.

Apart from size, differences in chassis and body configuration, and mechanical details irrelevant to the present invention, the apparatus of the tow vehicle 400 and trailer 401 may be the same as for the tow vehicle 10 and trailer 12 of FIG. 1A. FIG. 1B shows preferred location of components of a suitable system which may be incorporated into the tow vehicle 10 and trailer 12. The selected system may comprise any compatible one of systems 100, 100A, 200, 200A, 300, or 300A, to be described hereinafter. In the system selected for the tow vehicle 10 and trailer 12, a trailer battery 414 and system control components (shown collectively as a unit 406) are depicted in an advantage location for trailers of the type represented by the trailer 12.

Figure 2A:
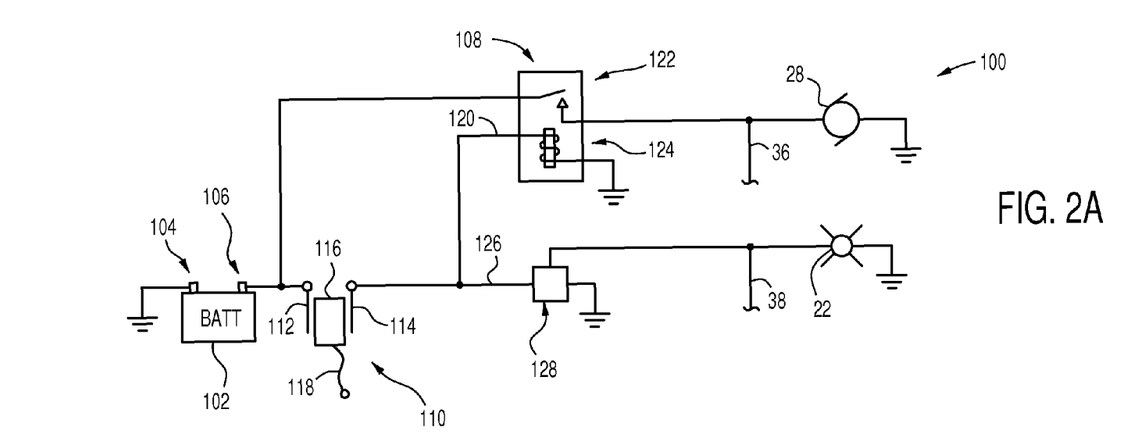
FIG. 2A is an electrical schematic of the novel system in one implementation thereof.

FIG. 2A shows a first implementation of the invention, comprising a system 100 for selectively and automatically operating electrical safety apparatus of a trailer such as the trailer 12, which is towed by a tow vehicle having electrical safety apparatus, such as the tow vehicle 10. The system 100 is carried aboard the trailer 12 except as noted, and comprises an emergency source of electric power compatible with the electrical safety apparatus. This emergency source of electric power is depicted as and represented by a battery 102 which is carried aboard the trailer 12, but may if desired take other forms. The negative terminal 104 of the battery 102 may be grounded to the tow vehicle frame or that of its associated trailer, as shown by the standard convention indicating a ground connection, and with the assumption that grounding is in common between the tow vehicle 10 and the trailer 12. The positive terminal 106 of the battery 102 may be connected in parallel as shown to a relay 108 and to a device which functions as a separation actuator.

The device functioning as a separation actuator in the implementation seen in FIG. 2A is a conventional breakaway switch 110 having electrical contacts. Breakaway switches are utilized to cope with unintended separation of trailers such as the trailer 12 for example. By contrast, it will be seen in subsequently described implementations of the invention that the separation actuator may respond to intentional separation by for example the operator of the tow vehicle 10.

The electrical contacts are shown representatively as conductive arms 112, 114 which will come into contact with one another when the breakaway switch 110 deploys. The breakaway switch 110 has a non-conductive body 116 which separates the conductive arms 112, 114 until a breakaway condition occurs. The non-conductive body 116 is fixed to a flexible tether 118 which may be tied or otherwise anchored to the tow vehicle 10. In the event of unintended or inadvertent decoupling of the trailer 12 from the tow vehicle 10, the non-conductive body 116 will be pulled from its original position in which it separates the conductive arms 112, 114, and will likely although not necessarily remain with the tow vehicle 10. The conductive arms 112, 114 will remain coupled to the trailer 12 for example due to being contained within a housing (not shown) which itself is mounted to the trailer 12, and will come into mutual contact, thereby establishing an electrical connection which conducts electrical power from the battery 102 to other components of the system 100 as shown.

It will be recognized that although the contacts of the breakaway switch 110 are described in terms of the arms 112, 114, these arms 112, 114 function as normally open electrical contacts that are closed when the tether 118 is subjected to a predetermined tension indicative of inadvertent decoupling of the trailer 12 from the tow vehicle 10.

The separation actuator may be said to operate in a standby mode wherein the conductive arms 112, 114 or electrical contacts are open or separated, and in a deployed mode wherein the electrical contacts are closed or in mutual contact. The standby mode is that which prevails when the tow vehicle 10 and trailer 12 are in use, but have not been inadvertently decoupled from one another. The deployed mode is that which prevails when the non-conductive body 116 has been pulled free of the conductive arms 112, 114, thereby energizing safety circuitry from the battery 102.

Safety circuitry will be understood to encompass the conductors shown as straight lines in FIGS. 2A, 2B, 2C, 3A, 3B, 4A, and 4B, and includes conductors, connectors, auxiliary devices such as fuses, circuit breakers, auxiliary relays, terminals, protective housings, and other devices such as indicating lights in the number required for operation as described herein. Conductors added to pre-existing wiring of a trailer such as the trailer 12 may connect to the pre-existing wiring such as the conductors 36 and 38 at any convenient point. The safety circuitry will be understood to include such pre-existing wiring where required. The fundamental but not necessarily exclusive function of the safety circuitry in any implementation of the invention presented herein is to connect the electrical safety apparatus to power from the emergency source of electric power, such as the battery 102, when the separation actuator, such as the breakaway switch 110, is in the deployed mode. More specifically, the safety circuitry may conduct power from the emergency source of power, such as the battery 102, to the separation actuator, such as the breakaway switch 110, through various intermediate devices such as the relay 108, and ultimately to the electrical safety apparatus.

It will be appreciated that the various conductors of the safety circuitry are not necessarily contiguous to one another in that they may be separated by components described herein. It will further be appreciated that a system such as the system 100 may be integrated into a trailer such as the trailer 12 during initial fabrication, or may be retrofitted thereto after initial fabrication. Hence the specific electrical conductors which are encompassed by the term "safety circuitry" necessarily vary with the specific application.

To operate as intended, the safety circuitry is electrically connected to the electric brake 28 and thereby actuates the latter when the breakaway switch 110 is in the deployed mode. To this end, power is conducted through normally open contacts 122 of the relay 108. The relay 108 is activated by electrical continuity established when the breakaway switch 110 deploys. A sub-circuit branch 120 energizes the coil 124 of the relay 108 so that the normally open contacts 122 close, thereby enabling power to be transmitted to the electric brake 28. The relay 108 may be a single pole, single throw relay having a coil arranged to operate at any voltage which is compatible with the battery 102, for example.

It will also be seen that electrical continuity established by deployment of the breakaway switch 110 is conducted by a sub-circuit branch 126 to a flasher 128. The flasher 128 may be a model EP-34, manufactured by Tridon Australia Pty Ltd, of Silverwater, New South Wales, Australia, or a similarly functioning substitute. Power is modified by the flasher 128 in that the continuous current available from the sub-circuit branch 126 is issued from the flasher in intermittent or pulsed form. Intermittent or pulsed power is conducted by the safety circuitry to the external light source, such as the running/marker light 22, so as to generate a flashing effect, or alternatively stated, to operate in an intermittent or flashing mode. In the example of FIG. 2A, running/marker light 22 as shown may represent at least one, or more than one, of the external light sources in any combination or number. These light sources may comprises at least one of running lights such as the side marker lights 26, brake lights such as the brake light 22, and turn signals such as the turn signal 24 provided as original manufacturer's equipment of the trailer 12. The light sources may also comprise one or more lights dedicated to alarm duty in the event the trailer becomes inadvertently decoupled from the tow vehicle (not shown), and may comprise one or more lights (not shown) not originally provided as part of the trailer 12.

An important feature of the invention is an anti-feedback feature which automatically inhibits electrical power from the tow vehicle 10 to be connected to the electrical safety apparatus by the safety circuitry under ordinary driving conditions and when the separation actuator is in the standby mode. Conventional road going trailers such as the trailer 12 may have external light sources such as the brake light 22, running light 24, and side marker lights 26, which are normally supplied with electric power from conductors such as the conductors 36, 38, which are not part of the safety circuitry in that they supply power to the external light sources and the electric brake 28 (where provided) when the separation actuator is in the standby mode. The anti-feedback feature prevents back feeding of the electric safety apparatus under ordinary conditions when the trailer 12 has not been inadvertently decoupled from the tow vehicle 10.

Figure 2B:
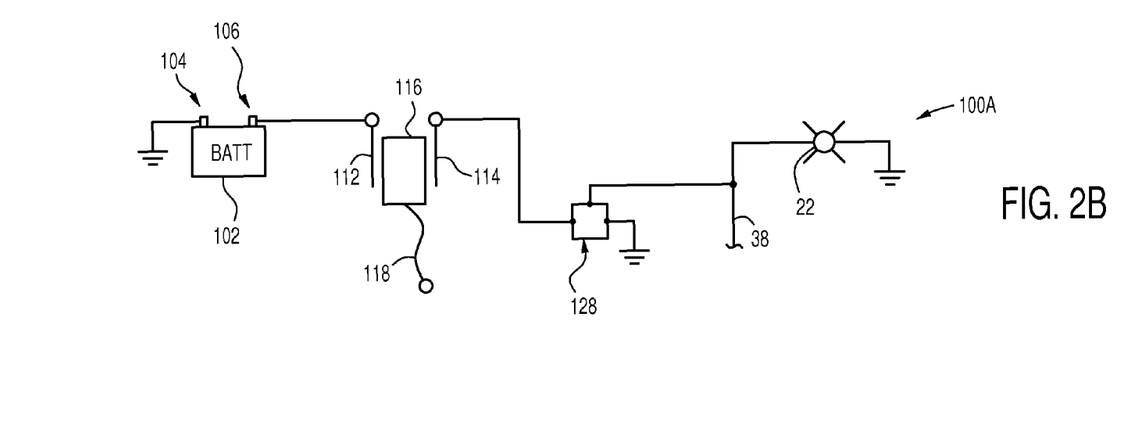
FIG. 2B is a simplification of the system of FIG. 2A, adapted for use with a trailer not having an electric brake.

FIG. 2B is a simplification of FIG. 2A, showing those components which would be used for trailers lacking an electric brake, seen in its modified form as a system 100A. It will be understood that an anti-feedback element, although not shown, may be inserted into the safety circuitry of the system 100A to protect against backfeed from the conductor 38, which is part of the original wiring harness of the trailer. The anti-feedback element may comprise a relay such as the relay 108 of FIG. 2A, or may comprise a diode as used in a system 150 of FIG. 2C.

Figure 2C:
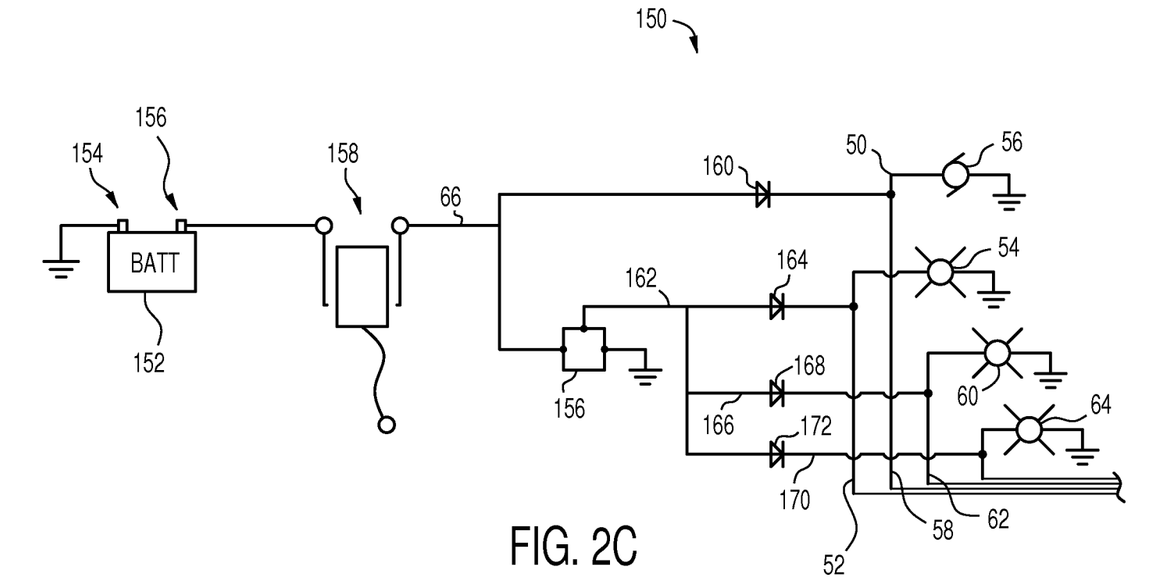
FIG. 2C is an electrical schematic of the novel system in another implementation thereof.

FIG. 2C shows another implementation of the invention, wherein the system 150 is adapted for use with a trailer having various external lights but no electric brake. The system 150 may comprise a battery 152 located onboard the trailer, having a grounded terminal 154 and a second terminal 156. The system 150 may incorporate a separation actuator such as a breakaway switch 158 which may be similar to the breakaway switch 110 of FIG. 2A. A circuit branch 66 may extend to a flasher 156, which may be similar to the flasher 128 of FIG. 2A, and to a diode 160. The diode 160 is disposed to prevent backfeed from a conductor 50 serving an electric brake 56 which conductor 50 is part of the wiring harness of the trailer. The flasher 156 may have an associated conductor 162 which is connected to a conductor 52 serving a brakelight 54. A diode 164 is disposed to prevent backfeed to the system 150 from the conductor 52. A branch conductor 166 serving a left turn signal light 60 may be connected to a conductor 58, which conductor 58 is part of the wiring harness of the trailer. A diode 168 prevents backfeed to the system 150 from the conductor 58. A branch conductor 170 serving a right turn signal 64 may extend to a conductor 62, which conductor 62 may be part of the wiring harness of the trailer. A diode 172 prevents feedback to the system 150 from the conductor 62. Hence in the system 150, the anti-feedback feature comprises one or more diodes, such as the diodes 160, 164, 168, 170.

Figure 3A:
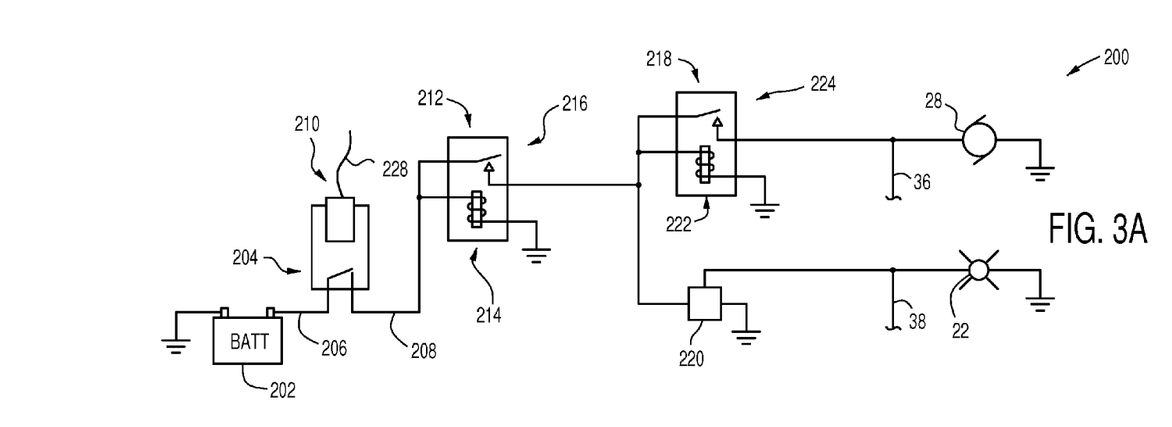
FIG. 3A is an electrical schematic of the novel system in a further implementation thereof.

FIG. 3A shows a further implementation of the invention comprising a system 200 for selectively and automatically operating electrical safety apparatus of a trailer such as the trailer 12, which is towed by a tow vehicle having electrical safety apparatus, such as the tow vehicle 10. The system 200 is carried aboard the trailer 12 in the manner of the system 100. The system 200 may comprise an emergency source of electric power compatible with the electrical safety apparatus, such as a battery 202 which may be the structural and functional equivalent of the battery 102. The battery 202 may be connected to the system 200 as shown by safety circuitry, which will be understood to have the same nature as the safety circuitry of the system 100.

The device functioning as a separation actuator in the implementation seen in FIG. 3A may comprise a multi-conductor connector 210 having elements of an associated wiring harness 228, which may be similar to the connector 32 of FIG. 1A, but modified to act in conjunction with a momentary contact switch 204 incorporated therewith. The multi-conductor connector 210 may be for example a seven-way plug, a six-way plug, or a semi-trailer plug of any well known type in widespread use today.

The momentary contact switch 204 may be arranged to close momentarily when the multi-conductor connector 210 is pulled from a terminal or socket associated with the tow vehicle 10, such as the socket 40 (see FIG. 1A), or a connector or terminal associated with conductors (not separately shown) to the same effect. Momentary connection is made between two conductors 206, 208, which may be arranged to conduct power from the battery 202 to a relay 212. The relay 212 may be a single pole, single throw electromechanical relay similar to the relay 108 of FIG. 2A for example. Power flowing from the battery 202 is connected both to the coil 214 and in parallel to normally open contacts 216. This arrangement provides a latching feature which maintains the safety circuitry connected to the battery 202 after the momentary contact switch has connected power at least momentarily to the safety circuitry after the momentary contact switch 204 is operated. When the normally open contacts 216 close responsively to energization of the coil 214, power is conducted to a second relay 218 and to a flasher 220. Power conducted to the relay 218 both energizes the coil 222 of the relay 218, and also flows to normally open contacts 224. When the normally closed contacts 224 close responsively to the coil 222 being energized, power flows to the electric brake 28. Power flowing to the flasher 220 may be pulsed as seen with the flasher 128 of FIG. 2A, and then flows to the brake light 22, which brake light 22 is representative of any of the external light sources of the trailer 12.

It will be appreciated that in the system 200, under normal conditions wherein the separation actuator provided by momentary contact switch 204 acting in conjunction with the multi-conductor connector 210 has not been pulled from its associated socket, the relay 218 prevents back-feeding of the brake light 22 from the conductor 38 which supplies power to the electric brake 28 from the tow vehicle 10. Similarly, and also under normal conditions, the relay 212 prevents back-feeding of sub-circuits associated with the multi-conductor connector 210 from the conductor 38 which is intended to supply power to the brake light 22.

In other respects, the system 200 supplies power to the external light sources represented by the brake light 22 and to the electric brake 28 in a manner similar to that of the system 100. In the system 200, the anti-feedback feature comprises a relay having normally open contacts which are disposed to control power flowing in the safety circuitry. Each of the relays 212 and 218 exemplifies such a relay. Such a relay has a control circuit (the control circuit being that sub-circuit serving the coil 214 or 222) with power from the safety circuitry when the separation actuator is in the deployed mode. In practice, full anti-feedback protection requires both of the relays 212 and 218.

The most significant difference between the system 100 of FIG. 2A and the system 200 of FIG. 3A is the nature of the separation actuator. In the system 100, the separation actuator may be a commercially available breakaway switch such as the breakaway switch 110. In the system 200, the separation actuator may be a multi-conductor connector modified to incorporate a momentary action switch, such as the combination represented by the multi-conductor connector 210. The salient similarity between the system 100 and the system 200 is that each is deployed by mechanical action acting on their respective separation actuators.

Figure 3B:
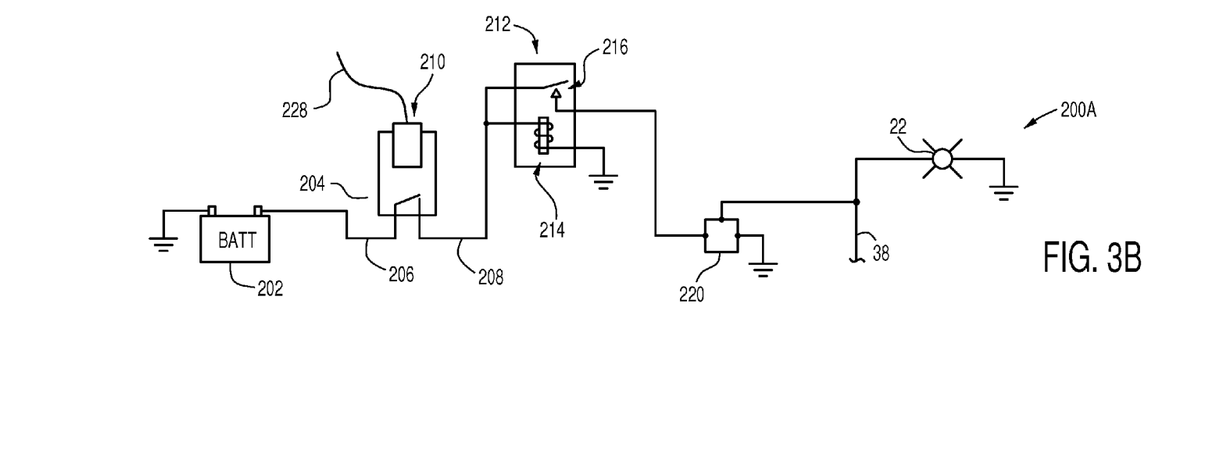
FIG. 3B is a simplification of the system of FIG. 3A, adapted for use with a trailer not having an electric brake.

FIG. 3B is a simplification of FIG. 3A, showing those components which would be used for trailers lacking an electric brake, seen as a system 200A. It will be understood that an anti-feedback element, although not shown, may be inserted into the safety circuitry of the system 200A to protect against backfeed from the conductor 38, which is part of the original wiring harness of the trailer. The anti-feedback element may comprise a relay such as the relay 212 of FIG. 3A, or may comprise a diode as used in a system 150 of FIG. 2C.

Figure 4A:
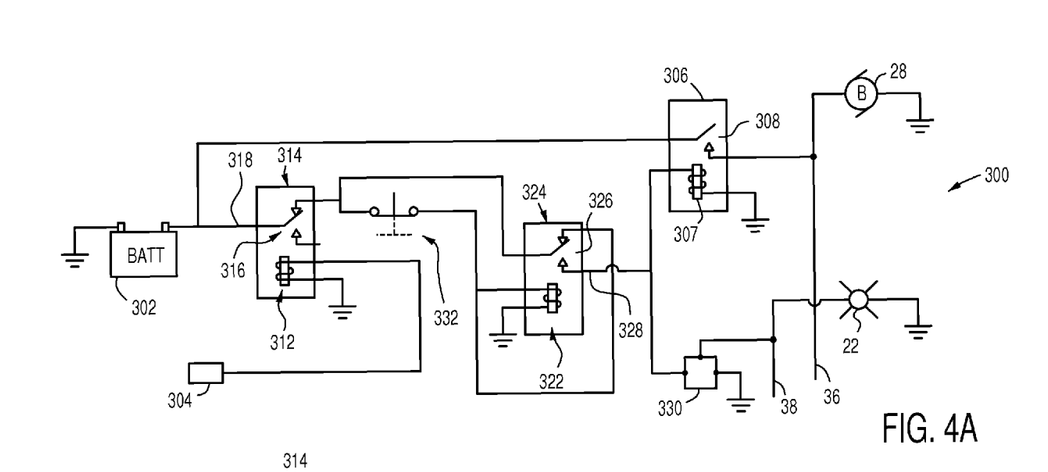
FIG. 4A is an electric schematic of the novel system in still another implementation thereof.

FIG. 4A shows a system 300 for selectively and automatically operating electrical safety apparatus of a trailer towed by a tow vehicle having at least one item of electrical safety apparatus in the event of unintended decoupling of the trailer from the tow vehicle. The tow vehicle may be the tow vehicle 10 for example; the trailer may be the trailer 12, these being seen in FIG. 1A. In the system 300, the electrical safety apparatus is connected to power from the electrical system of the tow vehicle, such as the battery 30 (see FIG. 1A), under ordinary conditions when the trailer is not decoupled from the tow vehicle. The safety circuitry is disposed to connect the electrical safety apparatus to power from an emergency source of electrical power carried on the trailer, such as a battery 302, when the power connection located between the electrical supply system of the tow vehicle and the safety circuitry is disconnected from the tow vehicle.

A distinction between the system 300 on one hand and the systems 100 and 200 on the other hand is that whereas the latter two systems 100 and 200 respond to mechanical decoupling of the trailer from the tow vehicle, the system 300 is voltage sensitive. That is, the system 300 responds to loss of operating voltage to the electrical safety apparatus from the electrical system of the tow vehicle rather than to a physical component being mechanically decoupled per se. In the system 300, the safety circuitry is disposed to connect the electrical safety apparatus to power from the emergency source of electric power of the trailer when voltage imposed on at least one item of electrical safety apparatus by the multi-conductor connector located between the electrical supply system of the tow vehicle and the safety circuitry has been discontinued.

The system 300 may comprise an emergency source of electric power compatible with the electrical safety apparatus, such as a battery 302, safety circuitry extending from the battery 302 to the electrical safety apparatus, and components to be further described herein. The electrical safety apparatus may include an electric brake such as the electric brake 28 and at least one external light source, represented by the marker/running light 22

The system 300 is used with trailers comprising a power connection located between the electrical supply system of the tow vehicle and the safety circuitry. This power connection is seen as a multi-conductor connector 304, which may be a known seven-wire connector or seven-way plug for example. The multi-conductor connector 304 may serve as the connector 32 seen in FIG. 1A.

It is important to note that FIG. 4A depicts the system 300 as it would be powered under ordinary conditions; that is, power from an energized terminal or conductor of the multi-conductor connector 304 has energized the coil 312 of a relay 314. In the event of removal of the multi-conductor connector 304 from its associated socket, the system 300 would deploy to operate the brake light 22 and the electric brake 28.

The marker/running light 22 and the electric brake 28 each are powered under ordinary conditions by respective dedicated conductors 38 and 36. These conductors 36, 38 may extend from the multi-conductor connector 304 for example, and may be energized at the discretion of the operator of the tow vehicle. Each circuit represented by the conductors 36, 38 has an anti-feedback feature which automatically inhibits electrical power from the tow vehicle connected to one item of the electrical safety apparatus (such as the brake light 22) to be backfed or connected to another item of the electrical safety apparatus (such as the electric brake 28) through the safety circuitry under ordinary driving conditions when the electric safety apparatus is intended to be powered from circuits originating at the tow vehicle. The circuit represented by the conductor 38 may be prevented by a diode 310 from energizing the coil 307 of a relay 306, which if energized would close normally open contacts 308, thereby conducting power from the battery 302 to the electric brake 28.

Should the multi-conductor connector 304 be removed from a socket or corresponding connector of the tow vehicle, all terminals and conductors associated with the multi-conductor connector 304 will become de-energized. This will de-energize the coil 312 of the relay 314. The relay 314 may be a single pole, double throw electromechanical relay, or alternatively stated, may have magnetically actuated form C contacts 316. De-energization of the coil 312 will break continuity from the multiconductor connector 304 to the conductor 318, and will establish continuity from the conductor 318 to the conductor 320. Power will then flow from the battery 302 to a coil 322 of a relay 324. Responsively, form C contacts 326 of the relay 324 will change state, thereby conducting power from the conductor 320 to a conductor 328. This will in turn transmit power to a flasher 330 and to the coil 307 of the relay 306. The flasher 330 will then conductor power to the brake light 22. The relay 306 will conduct power to the electric brake 28.

In summary, removal of the multi-conductor connector 304 from its socket or corresponding connector will result in power from the battery 302 being connected automatically to the brake light 22 and the electric brake 28. Because of its role in responding to removal of the multi-conductor connector 304, the relay 314 may be regarded as an electrically operated transfer relay which responds to opening of the power connection between the electrical supply system of the tow vehicle and the safety circuitry by transferring the safety circuitry from connection with the electrical supply system of the tow vehicle to connection with the emergency source of electrical power of the trailer. It will also be seen that the safety circuitry incorporates the electrically operated transfer relay such that the electrically operated transfer relay is disposed to function as an anti-back feed feature in addition to transferring the source of power operating the electrical safety apparatus from the electrical supply system of the tow vehicle to the emergency source of electrical power of the trailer.

This is desirable in certain situations such as at a staging area, parking lot, or the like, where a human operator may manually remove the multi-conductor connector 304 from the tow vehicle without disturbing the mechanical connection coupling the tow vehicle to the trailer Immediately and automatically, electric safety apparatus of the trailer is deployed.

FIG. 4A shows another feature which is particularly advantageous for use in staging areas. When it becomes time to move the trailer, the human operator will need a way to release the electrical safety apparatus from the deployed state. To this end, a manual overriding off switch is disposed to open the safety circuitry, thereby disconnecting the electrical safety apparatus from the emergency source of electric power. The overriding off switch may take the form of a normally closed, momentary open push-button switch 332.

Figure 4B:
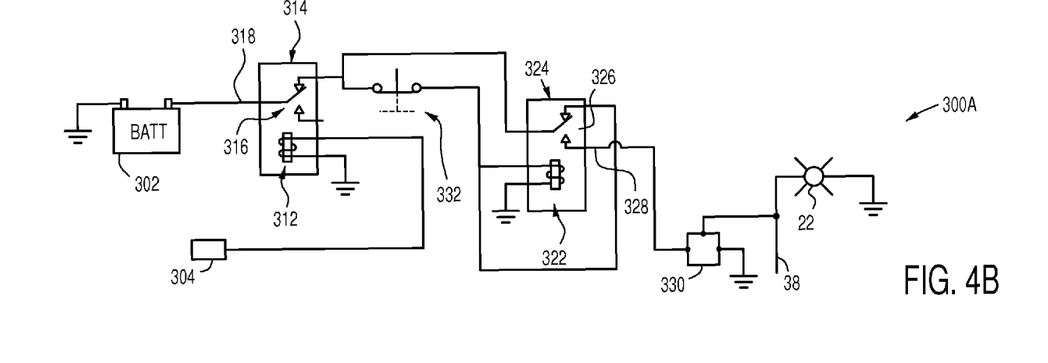
FIG. 4B is a simplification of the system of FIG. 4A, adapted for use with a trailer not having an electric brake.

FIG. 4B is a simplification of FIG. 4A, showing those components which would be used for trailers lacking an electric brake, seen as a system 300A. It will be understood that an anti-feedback element, although not shown, may be inserted into the safety circuitry of the system 300A to protect against backfeed from the conductor 38, which is part of the original wiring harness of the trailer. The anti-feedback element may comprise a relay such as the relay 212 of FIG. 3A, or may comprise a diode as used in a system 150 of FIG. 2C.

The invention may also be thought of as a road going trailer capable of being towed by a road going tow vehicle, having a system for selectively and automatically operating electrical safety apparatus of the trailer in the event of unintended decoupling of the trailer from the tow vehicle, wherein the electrical safety apparatus of the trailer is ordinarily connected to power from the tow vehicle when the trailer is coupled to the tow vehicle. Such a trailer, which may similar to the trailer 12, may comprise a load bed 42, shown covered by the body 16, a plurality of wheels (only one wheel 18 is shown in FIG. 1A) mounted to the load bed 42, a mechanical tow connection such as a tow bar 44 fixed to the trailer 12, which is disposed to releasably engage a corresponding mechanical tow element such as the ball (not visible) of a trailer hitch 46 of the tow vehicle 10, and at least one item of electrical safety apparatus such as the brake light 22, turn signal 24, side marker lights 26, and electric brake 28.

The system for selectively and automatically operating electrical safety apparatus may comprise the battery 302, safety circuitry extending from the emergency source of electric power to the electrical safety apparatus, a manually installed and removed plug-in type multi-conductor connector disposed to conduct power to the operating electrical safety apparatus from the tow vehicle, such as the multi-conductor connector 304, an electrically operated transfer relay which responds to opening of the power connection between the electrical supply system of the tow vehicle and the safety circuitry and consequent loss of voltage of the power from the electrical supply system of the tow vehicle by transferring the safety circuitry from connection with the electrical supply system of the tow vehicle to connection with the emergency source of electrical power of the trailer, such as the relay 314, and an anti-feedback feature which automatically inhibits electrical power from the tow vehicle to be backfed to at least one item of the electrical safety apparatus by the safety circuitry under ordinary driving conditions when the trailer is coupled to the tow vehicle. The anti-feedback feature may comprise a diode such as the diode 310, for inhibiting back feeding from lighting, and may further comprise a relay such as the relay 306.

It will be appreciated that any of the systems 100, 100A, 200, 200A, and 300, 300A described herein may be adapted for use wherein the tow vehicle is for example a passenger motor vehicle such as a light truck or automobile, but also to larger tow vehicles such as those used in eighteen wheel tow vehicle and trailer combinations for example.

The present invention is susceptible to modifications and variations which may be introduced thereto without departing from the inventive concepts. For example, the electrical safety apparatus could comprise one or more lights (not shown) provided only to enunciate the alarm condition. The electrical safety apparatus could comprise an audible alarm, a remote communications device for sending signals indicative of inadvertent separation of the trailer from the tow vehicle to a remote station, an events recorder disposed to record travel and incident data, in addition to the lights and the electric brake, or of course, any combination of these features. Also, the function of diodes and relays may be interchangeable, as the magnitude of current carried thereby permits.

Features of any of the implementations presented herein may be combined with other implementations where feasible. For example, the overriding off switch provided by the push-button 332 may be incorporated into the systems 100, 100A, 200, 200A if desired. A relay may be used in place of diodes where shown. The opposite is also true, provided that other functions described herein are satisfied and that the selected diode has a current rating sufficient for the purpose.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A system for selectively and automatically operating electrical safety apparatus of a trailer towed by a tow vehicle having electrical safety apparatus in the event of unintended decoupling of the trailer from the tow vehicle, wherein the electrical safety apparatus is connected to power from the tow vehicle, comprising:

an emergency source of electric power compatible with the electrical safety apparatus;

a separation actuator having electrical contacts, which said separation actuator may operate in a standby mode wherein the electrical contacts are open, and in a deployed mode wherein the electrical contacts are closed;

safety circuitry extending from the emergency source of electric power to the separation actuator and to the electrical safety apparatus; and an anti-feedback feature which automatically inhibits electrical power from the tow vehicle to be connected to the electrical safety apparatus by the safety circuitry while the trailer remains coupled to the tow vehicle, and while the tow vehicle remains in motion and when the separation actuator is in the standby mode, wherein the safety circuitry is disposed to connect the electrical safety apparatus to power from the emergency source of electric power when the separation actuator is in the deployed mode.

2. The system of claim 1, wherein the emergency source of electric power comprises a battery carried onboard the trailer.

3. The system of claim 1, wherein the electrical safety apparatus comprises at least one external light source mounted on the trailer.

4. The system of claim 3, further comprising a flasher disposed to conduct power from the safety circuitry to the external light source intermittently, so as to generate a flashing effect by the external sight source.

5. The system of claim 3, wherein the external light source are provided as original manufacturer's equipment of the trailer.

6. The system of claim 1, further comprising a manual switch disposed to break continuity of the safety circuitry such that the electrical safety apparatus is inhibited from operating regardless of whether the separation actuator is in the standby mode or in the deployed mode.

7. The system of claim 1, wherein the electrical safety apparatus comprises at least one electric brake which is electrically connected to the safety circuitry and is thereby actuated when the separation actuator is in the deployed mode.

8. The system of claim 1, wherein the anti-feedback feature comprises at least one relay having normally open contacts which are disposed to control power flowing in the safety circuitry.

9. The system of claim 8, wherein the relay has a control circuit which is supplied with electrical power from the safety circuitry when the separation actuator is in the deployed mode, and which said control circuit is de-energized when the safety circuitry is interrupted.

10. The system of claim 1, wherein the separation actuator comprises a breakaway switch further comprising a tether which is anchored to the tow vehicle and normally open electrical contacts that are closed when the tether is subjected to a predetermined tension indicative of inadvertent decoupling of the trailer from the tow vehicle.

11. The system of claim 1, wherein the separation actuator comprises a multiconductor connector acting in conjunction with a momentary action switch which is disposed to at least momentarily connect power from the emergency source of electric power to the safety circuitry when the multi-conductor connector is pulled from the tow vehicle.

12. The system of claim 11, further comprising a latching feature which maintains the safety circuitry connected to the emergency source of electric power after the momentary contact switch has connected power at least momentarily to the safety circuitry after the momentary contact switch is operated.

13. The system of claim 1, further comprising a manual overriding off switch disposed to open the safety circuitry, thereby disconnecting the electrical safety apparatus from the emergency source of electric power.

14. The system of claim 13, wherein the manual overriding off switch comprises a push-button switch.

15. A system for selectively and automatically operating electrical safety apparatus of a trailer towed by a tow vehicle having at least one item of electrical safety apparatus in the event of unintended decoupling of the trailer from the tow vehicle, wherein the electrical safety apparatus is connected to power from the tow vehicle when the trailer is not decoupled from the tow vehicle, comprising:

an emergency source of electric power compatible with the electrical safety apparatus;

safety circuitry extending from the emergency source of electric power to the electrical safety apparatus, and wherein the trailer comprises a manually separable multi-conductor;

a manually installed and removed plug-in type multi-conductor connector disposed to conduct power to the operating electrical safety apparatus from the electrical system of the tow vehicle and to impose a voltage on at least one item of electrical safety apparatus;

an anti-feedback feature which automatically inhibits electrical power from the tow vehicle to be connected to at least one item of the electrical safety apparatus by the safety circuitry while the trailer remains coupled to the tow vehicle, and while the tow vehicle remains in motion, when the multi-conductor connector is connected to the electrical system of the tow vehicle, wherein the safety circuitry is disposed to connect the electrical safety apparatus to power from the emergency source of electric power of the trailer when voltage imposed on at least one item of electrical safety apparatus by the multi-conductor connector located between the electrical supply system of the tow vehicle and the safety circuitry has been discontinued.

16. The system of claim 15, further comprising an electrically operated transfer relay which responds to discontinuation of voltage imposed on at least one item of electrical safety apparatus by the multi-conductor connector by transferring the safety circuitry from connection with the electrical supply system of the tow vehicle to connection with the emergency source of electrical power of the trailer; and wherein the safety circuitry incorporates the electrically operated transfer relay such that the electrically operated transfer relay is disposed to function as an anti-back feed feature in addition to transferring the source of power operating the electrical safety apparatus from the electrical supply system of the tow vehicle to the emergency source of electrical power of the trailer.

17. The system of claim 16, wherein the electrically operated transfer relay comprises a double throw electromechanical relay.

18. A road going trailer capable of being towed by a road going tow vehicle, having a system for selectively and automatically operating electrical safety apparatus of the trailer in the event of unintended decoupling of the trailer from the tow vehicle, wherein the electrical safety apparatus of the trailer is ordinarily connected to power from the tow vehicle when the trailer is coupled to the tow vehicle, comprising:

a trailer comprising a load bed, a plurality of wheels mounted to the load bed, a mechanical tow connection fixed to the trailer and disposed to releasably engage a corresponding mechanical tow element of the tow vehicle, and at least one item of electrical safety apparatus;

an emergency source of electric power compatible with the electrical safety apparatus;

safety circuitry extending from the emergency source of electric power to the electrical safety apparatus;

a manually installed and removed plug-in type multi-conductor connector disposed to conduct power to and impose voltage on the operating electrical safety apparatus from the tow vehicle;

an electrically operated transfer relay which responds to opening of the power connection between the electrical supply system of the tow vehicle and the safety circuitry and consequent loss of voltage of the power from the electrical supply system of the tow vehicle by transferring the safety circuitry from connection with the electrical supply system of the tow vehicle to connection with the emergency source of electrical power of the trailer; and an anti-feedback feature which automatically inhibits electrical power from the tractor to be backfed to at least one item of the electrical safety apparatus by the safety circuitry while the trailer remains coupled to the tow vehicle, and while the tow vehicle remains in motion when the trailer is coupled to the tractor.

* * * * *